(12) United States Patent
Eastland (10) Patent No.: US 9,745,867 B1
(45) Date of Patent: Aug. 29, 2017

(54) COMPOUND ENERGY CO-GENERATION SYSTEM

(71) Applicant: Loren R. Eastland, Riceville, IA (US)

(72) Inventor: Loren R. Eastland, Riceville, IA (US)

( * ) Notice: Subject to any disclaimer, the term of this patent is extended or adjusted under 35 U.S.C. 154(b) by 0 days.

(21) Appl. No.: 15/218,225

(22) Filed: Jul. 25, 2016

(51) Int. Cl.
| | | |
|---|---|---|
| F01K 17/02 | (2006.01) | |
| F01K 7/36 | (2006.01) | |
| F01K 7/44 | (2006.01) | |
| H02K 7/18 | (2006.01) | |
| H02K 7/06 | (2006.01) | |
| A01G 9/24 | (2006.01) | |

(52) U.S. Cl.
CPC ............ *F01K 17/02* (2013.01); *A01G 9/24* (2013.01); *A01G 9/243* (2013.01); *F01K 7/36* (2013.01); *F01K 7/44* (2013.01); *H02K 7/06* (2013.01); *H02K 7/1815* (2013.01); *H02K 7/1853* (2013.01)

(58) Field of Classification Search
CPC ............ Y02E 20/14; F01D 15/10; F02G 5/02
USPC .... 290/2, 1 A, 52; 60/674, 675, 676, 39.182
See application file for complete search history.

(56) References Cited

U.S. PATENT DOCUMENTS

| | | |
|---|---|---|
| 144,883 A | 11/1873 | Beekman |
| 169,269 A | 10/1875 | Johnson |
| 196,759 A | 11/1877 | Miller |
| 243,909 A | 7/1881 | Iske |
| 1,343,577 A | 6/1920 | Okey |
| 1,840,235 A * | 1/1932 | Kilbury ............... F22B 13/02 122/182.1 |
| 1,975,086 A * | 10/1934 | Dickey ............... F22B 35/10 122/448.4 |
| 2,015,850 A | 10/1935 | Harrod |
| 2,118,042 A * | 5/1938 | Glaenzer ............. B61C 17/02 105/236 |
| 2,265,878 A | 12/1941 | Stoker |
| 2,378,613 A | 6/1945 | Young et al. |
| 2,463,908 A * | 3/1949 | Rose ................... B60H 1/032 200/61.58 R |
| 2,491,434 A * | 12/1949 | Yellott ................ F02C 6/18 237/12.1 |
| 2,492,271 A | 12/1949 | Cox et al. |
| 2,802,114 A * | 8/1957 | Artsay ................ F01K 7/32 290/2 |
| 3,349,247 A * | 10/1967 | Birkestrand ........ H02K 7/1823 290/1 R |

(Continued)

*Primary Examiner* — Tulsidas C Patel
*Assistant Examiner* — Charles Reid, Jr.
(74) *Attorney, Agent, or Firm* — Albert W. Watkins (57) ABSTRACT

A compound energy co-generation system converts forestry, agricultural, and similar biomass to energy at the source farm. A working fluid reserve at the base is coupled with a boiler inlet. The boiler has a combustion chamber, a vertically rising exhaust stack, and a liquid jacket around the combustion chamber and rising from the working fluid reserve. The liquid jacket receives thermal energy from the combustion chamber and converts a portion of the liquid working fluid into a gas to create a dual-phase working fluid. A reciprocal fluid container, which in one embodiment is a piston and in another is a sealed and insulated container, receives the elevated liquid working fluid. The change in weight drives a power conversion system to convert lowering of the fluid container into electrical energy. Additional ordinarily wasted energy components are employed to perform useful work to improve overall efficiency.

8 Claims, 7 Drawing Sheets

(56) References Cited

U.S. PATENT DOCUMENTS

| | | | | |
|---|---|---|---|---|
| 3,375,664 | A | 4/1968 | Wells, Jr. | |
| 3,443,129 | A | 5/1969 | Hammitt | |
| 3,715,885 | A | 2/1973 | Schur | |
| 3,916,626 | A | 11/1975 | Schur | |
| 3,934,964 | A | 1/1976 | Diamond | |
| 3,983,704 | A | 10/1976 | Mcfarland | |
| 4,030,303 | A | 6/1977 | Kraus et al. | |
| 4,038,826 | A | 8/1977 | Shaw | |
| 4,054,031 | A | 10/1977 | Johnson | |
| 4,121,420 | A | 10/1978 | Schur | |
| 4,141,218 | A | 2/1979 | Rayboy | |
| 4,187,686 | A | 2/1980 | Pommier | |
| 4,192,145 | A | 3/1980 | Tanaka | |
| 4,196,590 | A | 4/1980 | Fries | |
| 4,232,524 | A | 11/1980 | Goyat | |
| 4,255,933 | A | 3/1981 | Bailey et al. | |
| 4,279,207 | A * | 7/1981 | Wormser | F22B 31/0007 110/345 |
| 4,363,212 | A | 12/1982 | Everett | |
| 4,372,123 | A | 2/1983 | Austin | |
| 4,432,339 | A * | 2/1984 | Hebert | F23B 1/30 126/367.1 |
| 4,486,701 | A | 12/1984 | Cover | |
| 4,498,294 | A | 2/1985 | Everett | |
| 4,571,534 | A | 2/1986 | Cover | |
| 4,658,591 | A * | 4/1987 | Alvarez | F01B 15/04 110/224 |
| 4,736,111 | A * | 4/1988 | Linden | F02B 63/04 290/2 |
| 4,767,938 | A | 8/1988 | Bervig | |
| 4,864,826 | A * | 9/1989 | Lagow | F01B 17/00 60/669 |
| 4,873,840 | A * | 10/1989 | Gilliusson | F01K 17/02 237/12.1 |
| 5,074,114 | A * | 12/1991 | Meijer | F02G 1/044 290/1 R |
| 5,685,147 | A | 11/1997 | Brassea | |
| 6,232,679 | B1 * | 5/2001 | Norton | F01D 15/10 237/12.1 |
| 6,290,142 | B1 * | 9/2001 | Togawa | F02G 5/00 165/299 |
| 6,412,281 | B2 | 7/2002 | Cover | |
| 6,525,431 | B1 * | 2/2003 | Clucas | F02G 1/04 290/1 R |
| 6,543,428 | B1 * | 4/2003 | Blandino | F02M 33/00 123/585 |
| 6,564,755 | B1 * | 5/2003 | Whelan | F24D 12/02 122/20 B |
| 6,978,610 | B2 | 12/2005 | Carnahan | |
| 7,067,933 | B2 * | 6/2006 | Bassett | F02G 1/043 290/2 |
| 7,279,800 | B2 * | 10/2007 | Bassett | F23G 5/46 290/1 R |
| 7,694,515 | B2 | 4/2010 | Miller | |
| 7,958,731 | B2 * | 6/2011 | McBride | F02C 6/16 60/613 |
| 8,393,153 | B2 | 3/2013 | Wolter | |
| 8,453,443 | B2 | 6/2013 | Kim | |
| 8,733,103 | B2 | 5/2014 | Paya Diaz | |
| 8,806,866 | B2 * | 8/2014 | McBride | F01B 23/00 60/509 |
| 8,875,513 | B2 | 11/2014 | Paya Diaz | |
| 9,097,152 | B2 * | 8/2015 | McAlister | C25B 1/00 |
| 2005/0262842 | A1 * | 12/2005 | Claassen | F01K 23/065 60/618 |
| 2007/0119175 | A1 * | 5/2007 | Ruggieri | F01K 25/06 60/649 |
| 2009/0295158 | A1 * | 12/2009 | Yuri | F01K 23/065 290/2 |
| 2010/0180839 | A1 * | 7/2010 | Otterstrom | F02B 47/02 123/3 |
| 2011/0068575 | A1 * | 3/2011 | Zabtcioglu | F01K 17/02 290/2 |
| 2011/0314810 | A1 * | 12/2011 | McBride | F15B 11/06 60/641.1 |
| 2011/0314816 | A1 * | 12/2011 | Julian | F01K 25/10 60/651 |
| 2013/0001957 | A1 * | 1/2013 | Thillen | H02K 7/1815 290/1 A |
| 2013/0112119 | A9 * | 5/2013 | Plett | F23B 50/06 110/208 |
| 2013/0341934 | A1 * | 12/2013 | Kawanishi | B60L 8/00 290/1 A |
| 2014/0093393 | A1 * | 4/2014 | Araki | F01P 5/12 417/12 |
| 2014/0345563 | A1 * | 11/2014 | McAlister | F02M 57/005 123/297 |
| 2015/0354398 | A1 * | 12/2015 | Rutten | F01K 3/004 290/2 |
| 2016/0045841 | A1 * | 2/2016 | Kaplan | B01J 19/0093 429/49 |

\* cited by examiner

COMPOUND ENERGY CO-GENERATION SYSTEM

BACKGROUND OF THE INVENTION

1. Field of the Invention

This invention pertains generally to power plants; and more particularly to high efficiency, low cost, and readily scaled biomass power generation systems. The power generation system incorporates a change of state of a fraction of the motive fluid responsive to externally applied heat. Motive fluid rises in a column owing to decreases density and kinetic energy transfer from gaseous phase bubbles therein. When fully elevated, the motive fluid then drives a gravity motor by the weight of the pumped water and condensed vapor to generate electricity.

2. Description of the Related Art

Approximately ninety percent of electric power generation is accomplished within the United States by burning combustible fuels to produce steam, and using the steam to drive a steam turbine. The fuels are mined or pumped from the earth, and represent a progressively more scarce resource. In order to most economically extract and utilize these anciently created fuels, modern power production is accomplished on a very large scale through enormous mining and drilling equipment, massive trains and pipelines for the transport of the fuel, and enormous centralized power plants. Unfortunately, these conventionally fueled power plants are not well adapted to the use of more renewable resources such as biomass.

Combustible matter will be understood to encompass a wide variety of flammable materials. With proper design consideration, many combustible materials may be used to generate the heat necessary to produce electrical energy. Furthermore, there are quite consequential and renewable sources of combustible materials that could be used to produce electricity. In the context of the present invention, a preferred source of combustible matter is agricultural biomass of otherwise little value. A good example are corn cobs, which are the byproduct of harvesting field or seed corn. These cobs are difficult to comminute, extremely slow to compost, and add little nutritional value to silage or other animal feed. However, since field corn is typically dried prior to storage, and often in the field to as great an extent as possible, these cobs can be quite dry as a normal part of the growing and harvesting process. They can provide significant energy upon combustion, and so have been recognized as a useful biomass source for energy production. Other similar biomass materials include many seed hulls, such as but not limited to peanut hulls and sunflower seed hulls.

As is known in the forestry and agricultural industries, transportation of relatively low-value biomass such as corn cobs, hulls, mixed or contaminated biomass, and the like is particularly difficult and generally quite expensive. Transportation costs tend to be relatively high due to the difficulty loading and unloading of biomass, which may be quite diverse in size and weight. Furthermore, the relatively high volume but low density material takes up substantial space, while containing relatively little combustible or otherwise usable matter. In contrasty, coal and oil are extremely energy dense. As a result, there has not been a particularly cost-effective way to transport many of these agricultural by-products to a central facility such as a centralized power plant.

Heretofore, these biomass materials such as corn cobs have primarily been burned for the sole purpose of providing heat to buildings and other similar static structures. This allows forestry and agricultural biomass to be converted to energy at the source farm, without requiring transportation over the roadways to a secondary generation location. This conversion to heat is definitely beneficial, and these cobs, hulls, and the like serve as a completely renewable resource. However, this is only of benefit for those establishments that have a need for large quantities of heat.

Unfortunately, for the relatively larger farms, the use of the available biomass for heat often will exceed the demand for heat by the farm. Furthermore, and particularly in more temperate climates, there may be relatively little heat required at all, other than for drying or to heat water or for quite limited other applications. As a result, the biomass available to an agricultural or forestry operation is substantially under-utilized today.

The conversion of heat to electricity has long been studied and refined, with many different techniques proposed and implemented over the years. In addition to the most prevalent steam turbines, various density-based turbines have been developed. Exemplary expansion-contraction container patents, the teachings and contents which are incorporated herein by reference, include: U.S. Pat. No. 4,121,420 by Schur, entitled "Gravity actuated thermal motor"; U.S. Pat. No. 6,978,610 by Carnahan, entitled "Reversible heat engine"; and U.S. Pat. No. 8,875,513 by Paya Diaz, entitled "Thermal energy conversion plant".

Another density-based turbine type operates through the substantial displacement of liquid with gas or steam. Exemplary patents that resemble the modern steam turbine, the teachings and contents which are incorporated herein by reference, include: U.S. Pat. No. 196,759 by Miller, entitled "Process for utilizing mercury as a motive power"; U.S. Pat. No. 1,343,577 by Okey, entitled "Heat-engine"; U.S. Pat. No. 2,265,878 by Stoker, entitled "Power apparatus"; U.S. Pat. No. 4,187,686 by Pommier, entitled "Power generator utilizing elevation-temperature differential"; U.S. Pat. No. 4,192,145 by Tanaka, entitled "Process for utilizing energy produced by the phase change of liquid"; U.S. Pat. No. 4,232,524 by Goyat, entitled "Production of industrial electrical energy from hydraulic energy"; U.S. Pat. No. 4,255,933 by Bailey et al, entitled "Geothermal power producing loop"; U.S. Pat. No. 4,372,123 by Austin, entitled "Thermal-gravity engine"; and U.S. Pat. No. 8,393,153 by Wolter, entitled "Method, device, and system for converting energy". Other similar exemplary pressure transport patents, the teachings and contents which are incorporated herein by reference, include: U.S. Pat. No. 3,983,704 by McFarland, entitled "Solar operated thermodynamic drive"; U.S. Pat. No. 243,909 by Iske, entitled "Motor"; and U.S. Pat. No. 7,694,515 by Miller, entitled "Engine".

Intermediate between steam and displacement are bubble-driven turbines. Exemplary patents, the teachings and contents which are incorporated herein by reference, include: U.S. Pat. No. 144,883 by Beekman, entitled "Steam engines"; U.S. Pat. No. 169,269 by Johnson, entitled "Rotary steam-engine"; U.S. Pat. No. 3,715,885 by Schur, entitled "Heat vapor differential engine"; U.S. Pat. No. 3,916,626 by Schur, entitled "Thermally powered generating system employing a heat vapor bubble engine"; U.S. Pat. No. 3,934,964 by Diamond, entitled "Gravity-actuated fluid displacement power generator"; U.S. Pat. No. 4,038,826 by Shaw, entitled "Solar energy system utilizing buoyancy as a conversion force"; U.S. Pat. No. 4,054,031 by Johnson, entitled "Power unit"; U.S. Pat. No. 4,141,218 by Rayboy, entitled "Buoyancy operated Sunmill"; U.S. Pat. No. 4,196,590 by Fries, entitled "Vapor buoyancy engine"; U.S. Pat.

No. 4,363,212 by Everett, entitled "Buoyancy prime mover"; U.S. Pat. No. 4,498,294 by Everett, entitled "Buoyancy prime mover with pressure control means"; U.S. Pat. No. 5,685,147 by Brassea, entitled "Buoyancy and thermal differentials energy generator"; and U.S. Pat. No. 8,453,443 by Kim, entitled "Engine for energy conversion".

Bubble transport engines that are not a typical gas pressure driven turbine, and instead rely upon the motion and density of bubbles to move the working fluid, may further be divided into two groups. The first group use a single fluid that is boiled to form a gas. Exemplary patents, the teachings and contents which are incorporated herein by reference, include: U.S. Pat. No. 3,375,664 by Wells, Jr, entitled "Convection current power generator"; and U.S. Pat. No. 3,443,129 by Hammitt, entitled "Vapor-liquid cycle MHD power conversion". Other artisans have incorporated one fluid into another. Exemplary patents, the teachings and contents which are incorporated herein by reference, include: U.S. Pat. No. 4,030,303 by Kraus et al, entitled "Waste heat regenerating system"; and U.S. Pat. No. 6,412,281 by Cover, entitled "Methods and apparatus for generating hydrodynamic energy and electrical energy generating systems employing the same".

Other exemplary bubble transport patents, the teachings and contents which are incorporated herein by reference, include: U.S. Pat. No. 4,486,701 by Cover, entitled "Thermal energy conversion"; U.S. Pat. No. 4,571,534 by Cover, entitled "Energy conversion system with fermentation"; U.S. Pat. No. 4,767,938 by Bervig, entitled "Fluid dynamic energy producing device"; and U.S. Pat. No. 8,733,103 by Paya Diaz, entitled "Thermal energy conversion plant".

Some of these systems are potentially applicable to the combustion of forestry and agricultural biomass, but each have suffered from one or another deficiency that has prevented wide spread adoption.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a compound energy co-generation system. A generally vertically rising cylinder has a base, a cylinder wall rising from the base and defining a generally cylindrical cavity, and a water outlet adjacent to the base. A working fluid reserve is provided adjacent to the base. A boiler has a combustion chamber and an exhaust stack. A liquid jacket rises vertically from the working fluid reserve that is in thermal communication with the boiler and receives at an inlet a liquid working fluid from the working fluid reserve. The water jacket is configured to receive thermal energy from the combustion of a combustible material in the combustion chamber and convert a portion of a liquid working fluid in the liquid jacket into a gas, to create a dual-phase working fluid that rises vertically within the liquid jacket to an outlet. A piston is reciprocal within and forms a substantially liquid-tight seal within and dividing the cylinder into two parts. The piston is configured to receive the liquid working fluid from the liquid jacket outlet, to lower responsive to receiving the liquid working fluid, and subsequent to lowering to release received liquid working fluid through the cylinder water outlet into the working fluid reserve. A power conversion system is coupled to the piston to convert the piston lowering into electrical energy.

In a second manifestation, the invention is a compound energy co-generation system. A base and a wall rising from the base together define a working fluid reserve adjacent to the base. A boiler has a combustion chamber and an exhaust stack. A liquid jacket rises vertically from the working fluid reserve that is in thermal communication with the boiler and receives at an inlet a liquid working fluid from the working fluid reserve. The water jacket is configured to receive thermal energy from the combustion of a combustible material in the combustion chamber and convert a portion of a liquid working fluid in the liquid jacket into a gas, to create a dual-phase working fluid that rises vertically within the liquid jacket to an outlet. A reservoir has a reservoir inlet configured to receive and accumulate liquid working fluid received from the liquid water jacket outlet. The reservoir also has a reservoir outlet. A substantially enclosed fluid transfer tank has a transfer tank inlet and a transfer tank outlet, and is configured to receive liquid working fluid from the liquid jacket outlet through the transfer tank inlet, to lower responsive to receiving the liquid working fluid, and subsequent to lowering to release the received liquid working fluid through the transfer tank outlet into the working fluid reserve. A power conversion system is coupled to the fluid transfer tank to convert the fluid transfer tank lowering into electrical energy.

In a third manifestation, the invention is a method of converting thermal energy into electrical energy. In accord with the method, combustible matter is burned within a combustion chamber to produce thermal energy. The thermal energy is then transferred into a working fluid contained within a vertically rising column, which causes the working fluid to rise within the column and at least partially exit therefrom. The exiting working fluid is received into an accumulator. A valve is opened in the accumulator, and working fluid is transferred through the valve from the accumulator into a fluid transfer apparatus. The fluid transfer apparatus is lowered, and this lowering of the fluid transfer apparatus is converted into electrical energy.

OBJECTS OF THE INVENTION

Exemplary embodiments of the present invention solve inadequacies of the prior art by providing a compound energy co-generation system that allows forestry, agricultural, and similar biomass to be converted to energy at the source farm, without requiring transportation over the roadways to a secondary generation location. In addition, secondary thermal usage is much better applied by the agricultural establishment, rather than a utility without agricultural expertise.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to enable efficient co-generation of energy that may selectively include the generation of various amounts of heat, electricity, hydrogen fuel, and ethanol to meet the particular needs of a generation facility. A second object of the invention is to provide a distributed power source that avoids the limitations and costs associated with a centralized power plant. Another object of the present invention is to utilize agricultural biomass that may be converted to various energy forms at the source, without requiring transportation. A further object of the invention is to enable effective secondary thermal usage that is applicable to agriculture by agricultural establishments, rather than utilities that are otherwise ill-equipped. Yet another object of the present invention is to improve efficiency of the heat and generation systems by close affiliation of the exhaust stack with water jacket. An additional objective of the invention is to use weight rather than pressure as a motive power source, to better preserve and extract energy from the energy co-generation system.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a compound energy co-generation system 100 that is particularly adapted to the generation of power from multiple distributed sources. Compound energy co-generation system 100 is constructed in a manner and having a basic geometry similar to existing agricultural structures. This allows agricultural biomass to be converted to energy at the source farm, without requiring transportation over the roadways to a secondary generation location. In addition, secondary lower value thermal energy is preferably directly consumed on location by the agricultural establishment, rather than by a utility without agricultural expertise.

Figure 1:
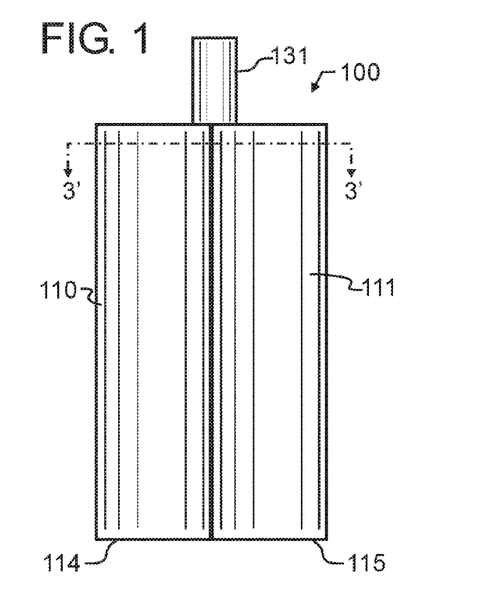
FIG. 1 illustrates a preferred embodiment compound energy co-generation system designed in accord with the teachings of the present invention from a side elevational view.

FIG. 1 illustrates preferred embodiment compound energy co-generation system 100, having the general appearance of a collection of silo-like cylinders 110, 111, 112, 113. Cylinder bases 114, 115 of corresponding cylinders 110, 111 are visible therein. Cylinders 110-113 may for exemplary purposes in the preferred embodiment be generally tubular and cylindrical. However, cylinders 110-113 may alternatively be fabricated of any other hollow, preferably tubular geometry, including but not solely limited to tubes having triangular, square, and pentagonal cross-sections.

Rising from between and above the tops of cylinders 110-113 is exhaust stack 131, which provides a discharge of hot exhaust gas released from the combustion of combustible matter. Combustible matter will be understood to encompass a wide variety of flammable materials. In the context of the present invention, a preferred source of combustible matter is agricultural biomass of otherwise little value. Good examples are corn cobs, seed or nut hulls, wood chips, sawdust, or the like described herein above, though any agricultural or forestry biomass or other combustible matter may be used. This can be particularly beneficial depending upon the market prices for various materials at any given instance. As an example, old newspapers and other recyclable materials are often recycled, but when the market demand is too low, these materials may instead be forwarded to a landfill. During such periods, these similarly combustible materials may instead be diverted from the landfill and converted by preferred embodiment compound energy co-generation system 100 into either or both of thermal energy and electrical energy. Even spoiled agricultural matter, such as moldy or otherwise spoiled grains may be converted into useful electrical and thermal energy by compound energy co-generation system 100.

Figure 2:
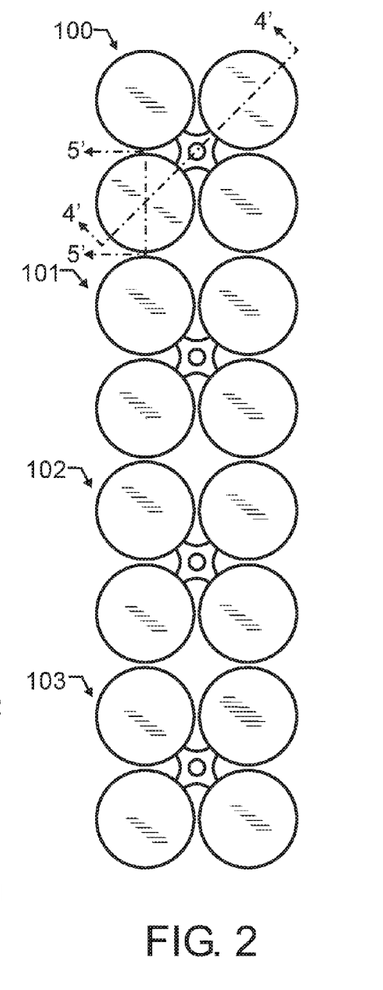
FIG. 2 illustrates a plurality of the preferred embodiment compound energy co-generation systems of FIG. 1 arranged in a physical group from top plan view, illustrating the modular nature of the present invention.

FIG. 2 illustrates a plurality of the preferred embodiment compound energy co-generation systems of FIG. 1 arranged in a physical group, illustrating the modular nature of the present invention. As illustrated, additional compound energy co-generation systems 101-103 have been physically co-located with compound energy co-generation system 100. Consequently, the preferred embodiment compound energy co-generation system 100 may readily be scaled to meet the needs of a particular location.

Figure 3:
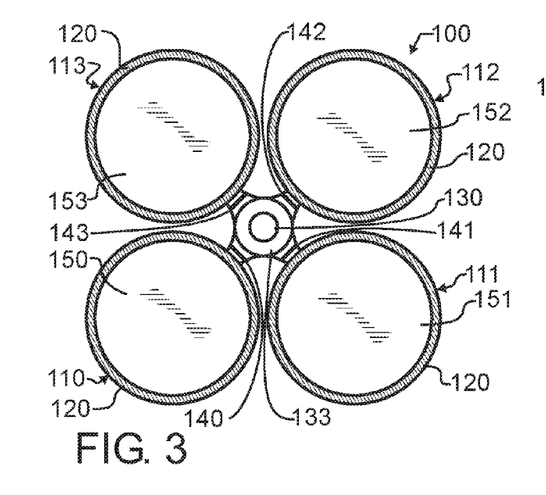
FIG. 3 illustrates the preferred embodiment compound energy co-generation system of FIG. 1 from a sectional view taken along section line 3' in FIG. 1.

FIG. 3 illustrates a sectional view of preferred embodiment compound energy co-generation system 100, looking down into the four cylinders 110-113. Each of the four cylinders 110-113 have a cylinder wall 120 that defines an open cylindrical space that is generally open vertically downward to a corresponding piston 150-153. Intermediate to the four cylinders 110-113 is a boiler 130 that is surrounded during operation by a dual-phase working fluid 133. Dual-phase working fluid 133 may, for exemplary purposes only and not solely limiting the present invention thereto, be comprised by water and steam, though other working fluids or mixtures of fluids are contemplated and will be considered to be incorporated herein.

Cylinders 110-113 are designed to be sequenced in the manner of a common two- or four-stroke internal combustion engine, wherein at any given moment only one or two of the cylinders are being driven downward. In order to control the flow of water into each cylinder, four corresponding working fluid flow control valves 140, 141, 142, 143 are provided. These working fluid flow control valves 140-143 may be of any suitable geometry and construction, and there are a myriad of known designs for valves in the mechanical art that will be considered to be incorporated herein. The particular sequencing of working fluid flow control valves 140-143 may for exemplary purposes be electronically or mechanically controlled to time appropriately with the desired movement of associated pistons 150-153.

In operation, boiler 130 will convert water into dual-phase working fluid 133, which will be driven upward due to several related and important phenomenon. First, the steam bubbles formed therein will rise, owing to the substantial lower density of the steam bubble relative to the surrounding water. This movement is not without resistance, due to friction and turbulence. As a result, the movement of the bubbles will tend to also move surrounding water upward. In addition, the combined water and steam bubbles also have a lower density than single phase liquid working fluid 134, which will also tend to lift dual-phase working fluid 133. Finally, the temperature of dual-phase working fluid 133 will be slightly higher than single phase liquid working fluid 134, which will again lift dual-phase working fluid 133. The quantity and relative volume of steam bubbles to liquid in dual-phase working fluid 133 will be somewhat regulated by the energy being released by combustion of matter within boiler 130, since without sufficient water movement, boiler 130 will produce more gaseous phase steam, which will in turn accelerate the movement of water upward within water jacket 132 with greater force, in turn quickly bringing back in more cooler water to slow the production of steam.

Figure 4:
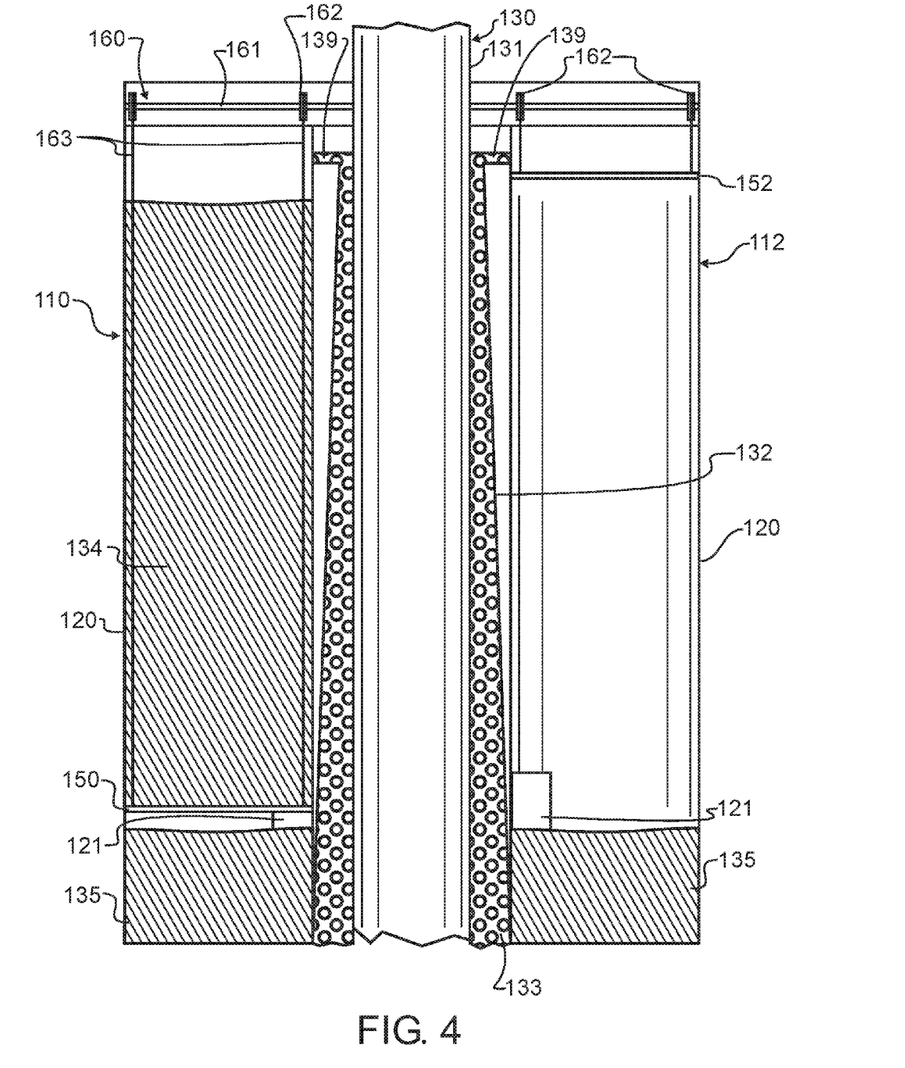
FIG. 4 illustrates the preferred embodiment compound energy co-generation system of FIG. 1 from a sectional view taken along section line 4' in FIG. 2.

FIG. 4 illustrates by vertical plane section view the internal arrangement within compound energy co-generation system 100. As illustrated, piston 152 within cylinder 112 is at the top of travel, just below the outlet of water jacket 132. Except for the closure by working fluid flow control valve 142, dual-phase working fluid 133 would be filling cylinder 112 in the space above piston 152. Instead, the only fluid within cylinder 112 is the baseline level provided by working fluid reserve 135.

In contrast, piston 150 within cylinder 110 is approaching the bottom of travel. Single phase liquid working fluid 134 has been directed through working fluid flow control valve 140 into cylinder 110. In the process, this additional weight has pushed down on piston 150. In preferred embodiment compound energy co-generation system 100, piston 150 is supported by a plurality of cables 163 that are configured to maintain piston 150 relatively level within cylinder 110, to thereby maintain a reasonably functional seal there between. Cables 163 each wrap about an associated spool 162, which may preferably incorporate a one-way clutch, which may optionally be electro-mechanically activated through a control system such as used to also actuate working fluid flow control valves 140-143. Spool 162 may also preferably incorporate a torsion return spring. With the weight of single phase liquid working fluid 134 pushing down on piston 150, cables 163 will unwind from associated spools 162. This unwinding will be coupled by locking of the clutch to rotate drive axle 161, which in turn serves as the source for motive rotational energy. Drive axle 161 may then be used to turn an electrical generator, similar to electrical generator 364 of FIG. 11, or any other suitable apparatus that may benefit from this motive rotational energy. Most preferably, the spring constant of the torsion return spring is relatively low such that as water is continued to be introduced into cylinder 110 from water jacket 132, piston 150 will continue to lower relatively unencumbered other than through the resistance of rotation of drive axle 161.

While drive axle 161, spools 162, and cables 163 are illustrated and described to translate piston movement into rotary motion, it will be understood herein that other equivalent mechanical systems may be used. For exemplary purposes only, and not solely limiting the invention thereto, one such system is that of rods and crankshaft similar to that of an internal combustion engine. In such alternative embodiment, the crankshaft may be subterranean or below water level, and provided with appropriate water seals where required.

Once piston 150 drops below the level of water outlet 121, single phase liquid working fluid 134 will discharge there through. Most preferably, the electro-mechanical clutch within spool 162 will be controlled to maintain piston 150 at an elevation below water outlet 121 long enough to allow for a complete or nearly complete discharge of single phase liquid working fluid 134 into working fluid reserve 135. Once discharge is complete, the clutch will be fully released, causing the torsion spring to rewind cable 163 onto spool 162, thereby raising piston 150 back up onto a position similar to that of piston 152 in FIG. 4.

While for illustrative purposes FIG. 4 shows single phase liquid working fluid 134 nearly completely filling cylinder 110 from top to bottom, in practice there will preferably be much less of single phase liquid working fluid 134 therein. This is because extra height of liquid within cylinder 110 is not efficiently converted into rotary kinetic energy within power conversion system 160.

An optional vacuum system may be provided to create a partial vacuum in the upper portion of each piston. Such a system is known and readily available that may create a 6-10% vacuum, which may assist with the bubble transport and other features of the present invention.

Figure 5:
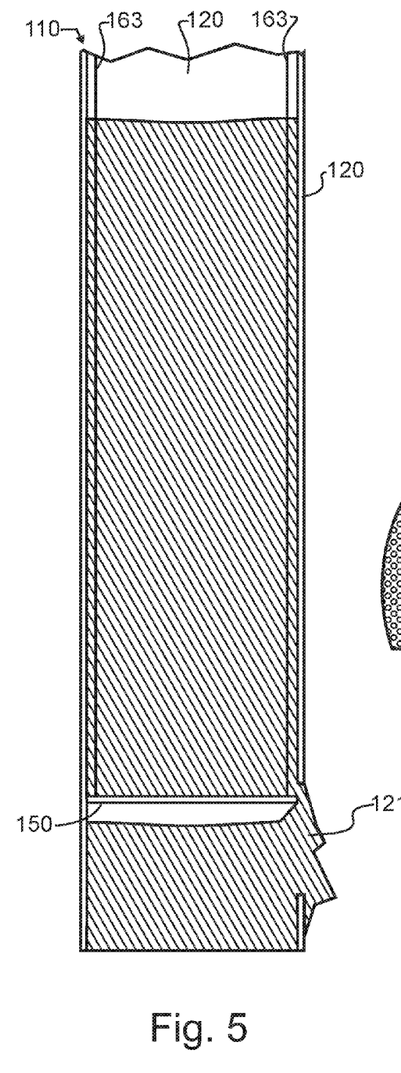
FIG. 5 illustrates the preferred embodiment compound energy co-generation system of FIG. 1 from a sectional view taken along section line 5' in FIG. 2.
Figure 6:
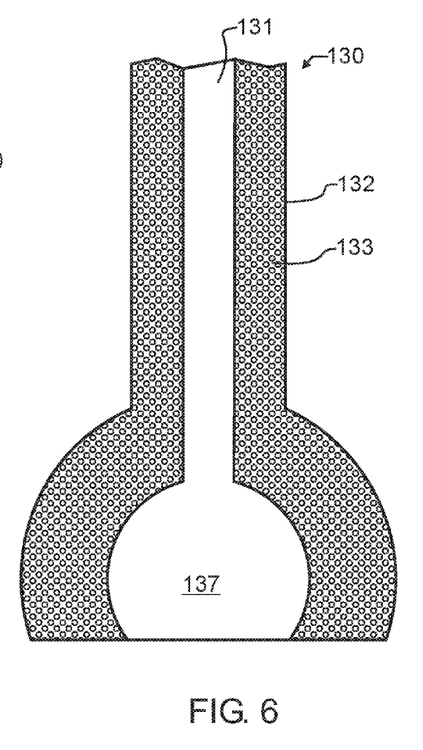
FIG. 6 illustrates an exemplary boiler that may be used in the preferred embodiment compound energy co-generation system of FIG. 1 from a vertical plane sectional view.

FIG. 5 illustrates cylinder 110 of FIG. 4 from a perpendicular sectional view, illustrating the opening 121 that spills into working fluid reserve 135. FIG. 6 illustrates an exemplary boiler 130 that may be used in the preferred embodiment compound energy co-generation system 100, though the particular geometry and construction thereof is not critical to the operation of the present invention. Consequently, fire box 137 may take any shape suitable for the introduction of combustible material, a myriad of geometries which are known in the industry of boilers. Desirable however is the presence of a relatively vertical exhaust stack 131 surrounded in a generally concentric or circumscribing manner by water jacket 132. This helps to provide continued heat exchange between the hot exhaust gas and surrounding dual-phase working fluid 133, thereby improving efficiency.

One of the challenges associated with the use of a dual-phase working fluid 133 is the conversion of steam carried as bubbles within dual-phase working fluid 133 back into single phase liquid working fluid 134. As may be apparent, without such conversion, there will either be a significant increase in pressure within the cylinders, or there will be a necessary release of steam, neither which is preferred. Instead, conversion can occur through natural heat exchange with a space exterior to cylinders 110-113, resulting in condensation of the steam. However, this too is normally undesirable, and instead will more commonly be implemented through one of several optional features.

Figure 7:
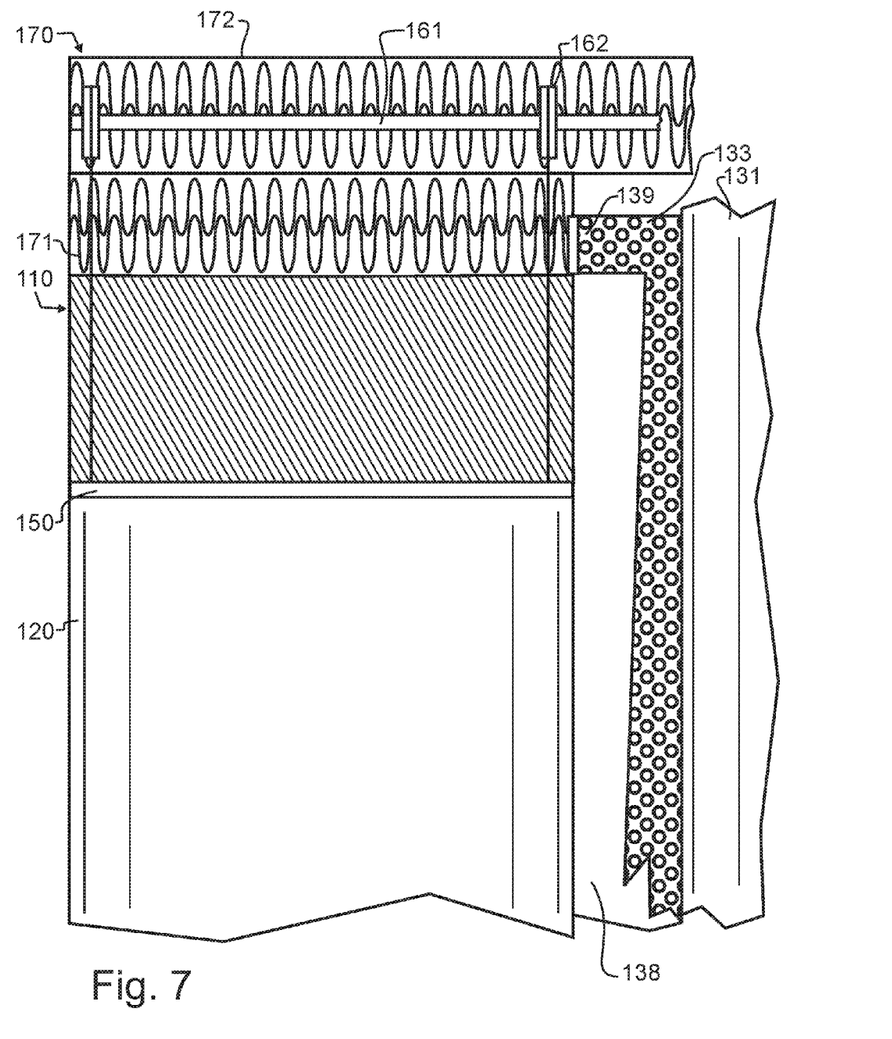
FIG. 7 illustrates the preferred embodiment compound energy co-generation system of FIG. 1 from an enlarged sectional view, similar to FIG. 4 and taken along section line 4' in FIG. 2, and in further combination with an optional heat exchanger.

FIG. 7 illustrates compound energy co-generation system 100 in further combination with an optional heat exchanger 170. Cooling coils 171, 172 may be provided adjacent to or even in line with the liquid jacket outlet 139, which provides an output of dual-phase working fluid 133 from water jacket 132. These cooling coils may for exemplary purposes be cooled through a traditional refrigeration system, wherein a refrigeration working fluid is first compressed which causes heating, then cooled, and then released from pressure to create a natural cooling. However, any other techniques for heat exchanging, including but not limited to thermo-electric devices such as Peltier effect and other devices are also contemplated herein. Regardless of the heat exchanger technology, most preferably the cooling coils are located adjacent to or in line with the output of dual-phase working fluid 133 from water jacket 132. A perforate plate may be provided as a part of or in addition to cooling coils 171, to assist with the condensation and cooling process as well. The heating coils are not visible in FIG. 7, but are understood to be incorporated within working fluid reserve 135. This means that the energy released through condensation of the gaseous phase fluid is returned to the working fluid.

Also visible in FIG. 7 is gap 138 between water jacket 132 and cylinder 110. This gap 138 may optionally be thermally insulated or filled instead with thermally conductive material. However, in either case some tolerance or other means is preferred to accommodate differences in thermal expansion when exhaust stack 131 heats to maximum temperature.

Figure 8:
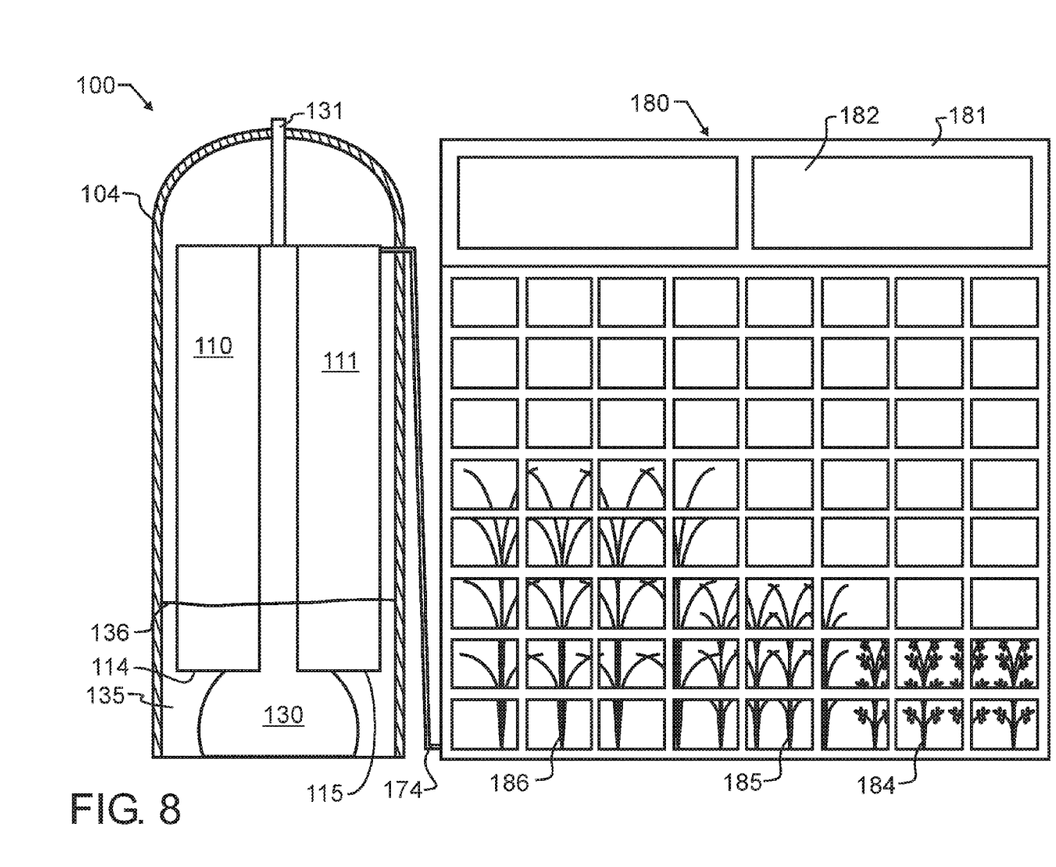
FIG. 8 illustrates the preferred embodiment compound energy co-generation system of FIG. 1 from a partial sectional view, and with an optional housing about the compound energy co-generation system, and in further combination with an optional greenhouse and steam heat exchanger.

FIG. 8 illustrates the preferred embodiment compound energy co-generation system of FIG. 1, but also with an optional housing 104 enclosing compound energy co-generation system 100. Housing 104 may be used to retain working fluid within working fluid reserve 135, for illustrative purposes to the level illustrated by working fluid top surface 136. Likewise, exhaust stack 131 will then rise above and pass through housing 104. The relationship between cylinders 110-113 and boiler 130 is well illustrated herein. As may be appreciated, access to fire box 137 must also be provided through housing 104.

In addition, an optional greenhouse and steam heat exchanger is provided which may be used instead of optional heat exchanger 170. In this case, an alternative embodiment steam line 174 is provided that couples the upper space within each cylinder 110-113 directly into a steam radiator within greenhouse 180. While the steam radiator is not separately illustrated, the myriad of designs are well known in the field of HVAC (heating, Ventilation, and Air Conditioning), and have been used for more than one hundred years to heat various buildings. Consequently, there are many suitable designs and configurations that are commercially available yet today. While the particular construction of greenhouse 180 is not critical to the present invention, for exemplary purposes a frame 181 is provided with windows 182 that allow sunlight to shine upon various plants 184-186.

Particularly noteworthy here is the fact that, historically, centrally located power plants have struggled with usage of this relatively lower value "waste" heat. Some have experimented with greenhouses, but an issue that has always arisen is the diverse nature of the growing of crops compared to power generation. In other words, the utility company is not well equipped, with either personnel or equipment, to manage economic growth of crops. With the teachings of the present invention, a farm that is well-equipped to manage the growth of plants is also provided with this source of low-value or "waste" heat, and can very efficiently use the "waste" heat for the growth of plants.

The present invention further contemplates the inclusion of both heat exchanger 170 and greenhouse 180, the use of each which may for exemplary purposes be determined by the particular season. For example, during the summer there is little need in most geographic locations to heat a greenhouse. Consequently, during the summer months, heat exchanger 170 may be employed to extract latent heat from the steam, and return this energy to working fluid reserve 135. However, in the winter and spring months, greenhouse 180 may prove to be particularly economical to operate.

In addition to the production of thermal energy and electrical energy, the present invention is well adapted to conversion to other energy and fuel forms as well. Electricity may be used to electrolytically produce hydrogen, which may then serve as a renewable and portable fuel. Heat may be used to grow crops susceptible to fermentation and the production of ethanol. The heat may also be used for the requisite drying of the ethanol prior to use as a fuel. In addition, heat may be used to dry other types of biomass, rendering such biomass more usable for combustion or other production of energy.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 9:
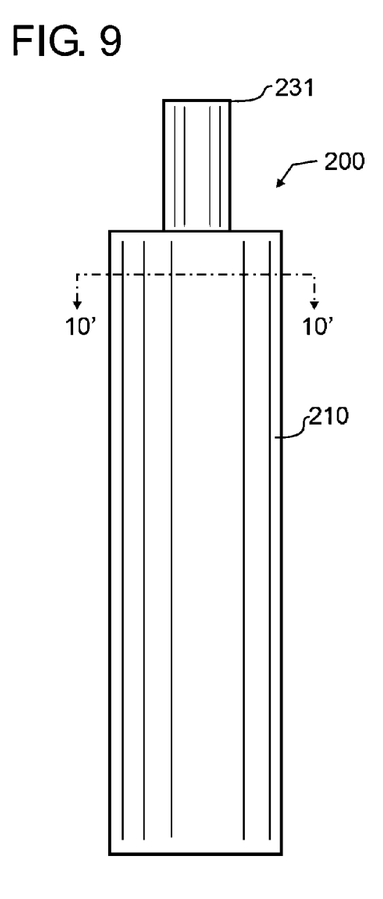
FIG. 9 illustrates a first alternative embodiment compound energy co-generation system designed in accord with the teachings of the present invention from a side elevational view.
Figure 10:
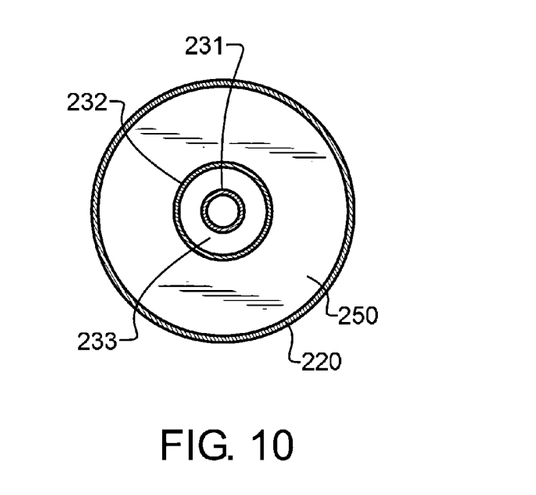
FIG. 10 illustrates the first alternative embodiment compound energy co-generation system of FIG. 1 from a sectional view taken along section line 10' in FIG. 9.

FIGS. 9 and 10 illustrate a first alternative embodiment compound energy co-generation system 200. In this embodiment, a single cylinder 210 is provided, and an exhaust stack 231 extends centrally and vertically therefrom. Piston 250 will reciprocate within cylinder wall 220, and has the general geometry of a hardware washer or annular disk. Interior of piston 250 and concentric about exhaust stack 231 are dual-phase working fluid 233 retained within water jacket 232. During operation, dual-phase working fluid 233 will be expelled from within water jacket 232, and retained by piston 250. However, for effective and efficient operation of first alternative embodiment compound energy co-generation system 200, the fire box will require intermittent operation. Control may be achieved by intermittently opening air into the fire box to cause expulsion of dual-phase working fluid 233, followed by restriction of air flow into the firebox to limit or stop expulsion of dual-phase working fluid 233. This will allow piston 250 to travel to the discharge position without undesirable additional introduction of fluid onto piston 250. Alternatively, a heating and pumping system similar to that illustrated by McFarland in U.S. Pat. No. 3,983,704 incorporated herein above by reference may be used to produce a periodic flow.

Figure 11:
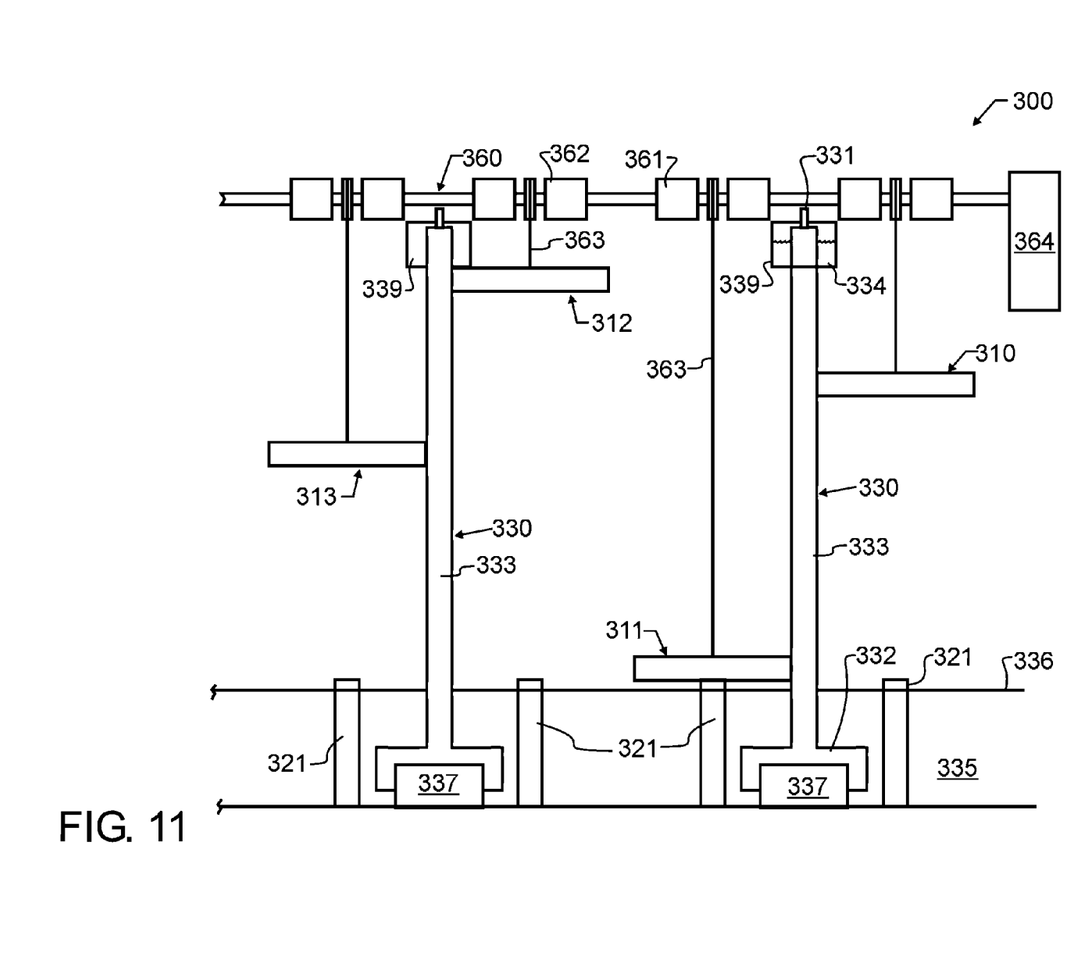
FIG. 11 illustrates a second alternative embodiment compound energy co-generation system designed in accord with the teachings of the present invention from a side elevational view.

FIG. 11 illustrates a second alternative embodiment compound energy co-generation system 300. In this embodiment, rather than cylinders a plurality of fluid transfer tanks such as 310-313 are provided that are alternatively filled, lowered, discharged, and then elevated back to fill position. When at the bottom of travel, one or more fluid release pins 321 are used to open at least one flapper valve in the bottom of each fluid transfer tank 310-313, allowing fluid to return to working fluid reserve 335. An exemplary flapper valve that may be used, and which would be opened properly by fluid release pins 321, is illustrated in U.S. Pat. No. 2,378,613 by Young et al, entitled "Fuel tank flapper valve," the teachings and contents which are incorporated herein by reference. In one embodiment, fluid transfer tanks 310-313 may be insulated, to provide greater thermal operating efficiency.

One or a plurality of boilers 330 are provided similar to boiler 130. However, encompassing the open top of each water jacket 332 is a reservoir 339 designed to accumulate single phase liquid working fluid 334. Exhaust stack 331 will in this embodiment pass through a center of reservoir 339 and vent to the exterior. When an associated fluid transfer tank 310-313 reaches the upper travel and abuts with reservoir 339, a valve which may for exemplary and non-limiting purposes include a flapper valve and release pin similar to fluid release pins 321 will cause a transfer of single phase liquid working fluid 334 from reservoir 339 to the associated one of fluid transfer tank 310-313. In addition to fluid release pins 321 and the Young et al patent incorporated herein above, several additional patents illustrate similar valves that are actuated by the coupling such as an inlet to fluid transfer tanks 310-313 engaging with an outlet from reservoir 339, including 2,492,271 by Cox et al, entitled "Flapper valve"; and U.S. Pat. No. 2,015,850 by Harrod, entitled "Bilge water eductor"," the teachings and contents of each which are incorporated herein by reference. Furthermore, there are many alternative valves that provide opening upon coupling and closing upon separating of conduits, and these or other functional equivalents thereto will be understood to be incorporated herein by reference.

Power conversion system 360 resembles power conversion system 160, and may for exemplary purposes include a drive axle 361, spool 362 which may preferably incorporate a one-way clutch and torsion spring, a plurality of cables 363, and an electrical generator 364.

Noteworthy is that this reservoir 339 may for exemplary purposes also be used in combination with first alternative embodiment compound energy co-generation system 200, to accumulate liquid while piston 250 is moving to produce energy. When piston 250 rises to the top of travel, then the contents of a reservoir such a reservoir 339 may be rapidly discharged into cylinder 210, to drive piston 250 downward again.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A compound energy co-generation system, comprising:
   a generally vertically rising cylinder having a base, a cylinder wall rising from said base and defining a generally cylindrical cavity, and a cylinder water outlet adjacent to said base;
   a working fluid reserve adjacent to said base;
   a boiler having a combustion chamber, and an exhaust stack;
   a liquid jacket rising vertically from said working fluid reserve that is in thermal communication with said boiler and receives a liquid working fluid from said working fluid reserve, said liquid jacket configured to receive thermal energy from the combustion of a combustible material in said combustion chamber and convert a portion of a liquid working fluid in said liquid jacket into a gas to create a dual-phase working fluid that rises vertically within said liquid jacket to a liquid jacket outlet;
   a piston reciprocal within and forming a substantially liquid-tight seal within and dividing said cylinder into two parts and configured to receive said liquid working fluid from said liquid jacket outlet, said piston configured to lower responsive to receiving said liquid working fluid, and subsequent to said lowering to release said received liquid working fluid through said cylinder water outlet into said working fluid reserve; and
   an electrical generator connected to a drive axle coupled to said piston to convert said piston movement into electrical energy.

2. The compound energy co-generation system of claim 1, wherein said liquid jacket further comprises water.

3. The compound energy co-generation system of claim 1, wherein said dual-phase working fluid further comprises water and steam.

4. The compound energy co-generation system of claim 1, wherein said exhaust stack further comprises a generally vertically rising stack that conducts thermal energy to said liquid jacket substantially throughout a length of said liquid jacket.

5. The compound energy co-generation system of claim 1, further comprising:
   a spool coupled to said drive axle having a one-way clutch and a torsion spring; and
   a cable at least partially wrapped about said spool and extending therefrom to said piston.

6. The compound energy co-generation system of claim 1, further comprising a heat exchanger having a cooling member withdrawing thermal energy from said dual phase working fluid ejected from said liquid jacket outlet.

7. The compound energy co-generation system of claim 1, wherein said generally vertically rising cylinder further comprises a plurality of generally vertically rising cylinders generally encircling said exhaust stack, and further comprising a plurality of working fluid flow control valves to selectively distribute said dual-phase working fluid from said liquid jacket outlet to individual ones of said plurality of cylinders but less than all of said plurality of cylinders.

8. The compound energy co-generation system of claim 1, wherein said piston is substantially coaxial with and circumscribes said liquid jacket and said exhaust stack.

* * * * *